United States Patent
Mascioli et al.

[11] Patent Number: 5,240,631
[45] Date of Patent: Aug. 31, 1993

[54] ANTIFREEZE FORMULATION CONTAINING PHOSPHOROUS ACID

[75] Inventors: Rocco L. Mascioli, Media; Levi F. Scott, Jr., Yeadon, both of Pa.

[73] Assignee: ARCO Chemical Technology, L.P., Wilmington, Del.

[21] Appl. No.: 792,495

[22] Filed: Nov. 13, 1991

[51] Int. Cl.$^5$ ............................................. C01K 5/06
[52] U.S. Cl. ................................. 252/75; 252/74; 252/77; 252/98.5
[58] Field of Search ............................ 252/75, 74, 67

[56] References Cited

U.S. PATENT DOCUMENTS

| | | | |
|---|---|---|---|
| 2,147,409 | 2/1992 | Lamprey | 252/25 |
| 2,373,570 | 4/1945 | Keller | 252/74 |
| 2,566,923 | 9/1951 | Burghart | 252/74 |
| 2,726,215 | 12/1955 | Jones | 252/74 |
| 2,815,328 | 12/1957 | Green et al. | 252/74 |
| 3,960,740 | 6/1976 | Truett | 252/75 |
| 4,000,079 | 12/1976 | Ramp et al. | 252/75 |
| 4,149,985 | 4/1979 | Wilson | 252/75 |
| 4,219,433 | 8/1980 | Manabe et al. | 252/75 |
| 4,242,214 | 12/1980 | Lambert | 252/75 |
| 4,338,209 | 7/1982 | Manabe | 252/75 |
| 4,382,008 | 5/1983 | Boreland et al. | 252/75 |
| 4,382,870 | 3/1983 | Abel et al. | 252/75 |
| 4,389,371 | 6/1983 | Wilson et al. | 252/75 |
| 4,414,126 | 11/1983 | Wilson | 252/75 |
| 4,450,088 | 5/1984 | Wilson et al. | 252/75 |
| 4,452,758 | 6/1984 | Wilson et al. | 252/75 |
| 4,455,248 | 6/1984 | Wood | 252/75 |
| 4,508,684 | 4/1985 | Huff | 252/74 |
| 4,525,925 | 10/1985 | Bosea et al. | 252/74 |
| 4,587,028 | 5/1986 | Darden | 252/75 |
| 4,588,513 | 5/1986 | Triebel et al. | 252/75 |
| 4,661,990 | 12/1986 | Darden | 252/75 |
| 4,725,405 | 2/1988 | Cassin et al. | 252/75 |
| 4,759,864 | 7/1988 | Van Nesta | 252/75 |
| 4,772,408 | 9/1988 | Mohr et al. | 252/75 |

FOREIGN PATENT DOCUMENTS 1004259  9/1965  United Kingdom .

Primary Examiner—Paul Lieberman
Assistant Examiner—Necholus Ogden
Attorney, Agent, or Firm—William C. Long

[57] ABSTRACT

The invention provides an alkylene glycol, preferably propylene glycol, anti-corrosive antifreeze concentrate composed of the glycol and small but effective amounts of borate, molybdate, tolyltriazole, phosphorous acid, optionally nitrate and silicate. The concentrate is suitably combined with water to form an internal combustion engine coolant which meets all ASTM testing criteria.

8 Claims, No Drawings

ANTIFREEZE FORMULATION CONTAINING PHOSPHOROUS ACID

BACKGROUND OF THE INVENTION

1. Field of the Invention

The present invention relates to corrosion-inhibited antifreeze concentrate formulations and to aqueous corrosion-inhibited antifreeze formulations for use in the cooling systems of internal combustion engines. In particular, the invention relates to an antifreeze concentrate comprised predominantly of a glycol, most notably propylene glycol, together with borate, molybdate, tolyltriazole, silicate, phosphorous acid, optionally nitrate, and to aqueous formulations containing said concentrate.

2. Description of the Prior Art

The use of each of the components employed in the formulations of the present invention is taught in the art.

Propylene glycol is taught as a freezing point depressant in antifreeze formulations, for example in U.S. Pat. Nos. 2,147,409, 4,149,985 and many others.

Alkali metal borates have been used as corrosion-inhibitors in antifreeze formulations. See, for example, U.S. Pat. Nos. 4,149,985, 2,566,923, 3,960,740, 2,373,570, 2,815,328 and the like.

Alkali metal sebacates have been used as corrosion inhibitors in aqueous systems as taught in U.S. Pat. No. 2,726,215, and in antifreeze coolants as taught in U.K. Patent 1,004,259 and in U.S. Pat. Nos. 4,382,008, 4,561,990, 4,587,028, 4,588,513 and the like.

Alkali metal molybdates have been taught as corrosion-inhibitors in antifreeze formulations. See U.S. Pat. Nos. 2,147,409 and 4,561,990, for example.

Alkali metal mercaptobenzothiazole has been used in antifreeze formulations along with other additives. See, for example, U.S. Pat. Nos. 2,815,328, 4,455,248, 4,414,126, 4,545,925 and the like.

Alkali metal nitrates have been added to antifreeze formulations as corrosion-inhibitors. See, for example, U.S. Patents 2,815,328, 4,508,684, 4,455,248, 4,587,028 and the like.

Tolyltriazole is taught as an antifreeze formulation component, for example in U.S. Pat. Nos. 4,242,214, 2,587,028, 4,382,008, U.K. Patent 1,004,259 and the like.

In addition, alkali metal silicates are shown as antifreeze components in, for example, U.S. Pat. Nos. 2,815,328, 4,242,214, 4,382,008, 4,382,870, 4,455,248, 4,149,985 and the like.

Phosphorous acid is named as an antifreeze component in U.S. Pat. Nos. 4,389,371, 4,450,088 and 4,452,758.

Alkali metal phosphates have been used as corrosion-inhibiting components of antifreeze formulations as shown, for example, in U.S. Pat. Nos. 2,147,409, 4,382,870, 4,455,248, 4,149,985, 4,545,925 and the like.

A considerable number of patents have been granted which are directed to antifreeze formulations which comprise certain specific combinations of components. Included among such patents are U.S. Pat. Nos. 4,242,214, 4,382,008, 4,382,870, 4,455,248, 4,561,990, 4,587,028, 4,588,513, 4,545,925, 4,000,079, 4,338,209, 4,759,864, 4,219,433 and many others.

SUMMARY OF INVENTION

The present invention relates to an anti-corrosive antifreeze concentrate and to stable aqueous antifreeze coolants using the concentrate which satisfy the rigorous standards imposed on such coolants. Specifically, the present invention provides an antifreeze concentrate comprised of a major proportion of an alkylene glycol together with small but critical amounts of borate, molybdate, tolyltriazole, silicate, phosphorous acid, optionally nitrate as well as to aqueous coolants containing the concentrate. Especially preferred concentrates are those wherein the alkylene glycol is propylene glycol.

DETAILED DESCRIPTION OF THE INVENTION

Alkylene glycols which are used in the formulations of the invention include ethylene glycol, propylene glycol, diethylene glycol and mixtures. Formulations containing propylene glycol are preferred. In general, the antifreeze concentrates of the invention contain 90 to 98 wt % of the glycol, although this amount may vary considerably.

A problem which has been encountered with antifreeze formulations, especially those where propylene glycol is a primary component, has been the tendency for oxidation to occur causing the formation of undesirable oxidation products. According to the present invention, the addition of phosphorous acid to the formulation results in marked improvement in the oxidation stability of the antifreeze.

As above indicated, the antifreeze concentrate of the invention contains, in addition to glycol, small but critical and effective amounts of borate, molybdate, optionally nitrate, tolyltriazole, phosphorous acid and silicate. These components are incorporated in the antifreeze concentrate in soluble compound form, preferably in the form of an alkali metal salt, and most preferably as the sodium or potassium salt.

The antifreeze concentrate of the present invention contains by weight 0.1 to 0.4% borate calculated as $B_4O_7$, 0.07 to 0.2% molybdate calculated as $MoO_4$, 0.05 to 0.15% phosphorous acid calculated as $H_3PO_3$, 0 to 0.2 nitrate calculated as $NO_3$, 0.07 to 0.22% tolyltriazole calculated as tolyltriazole, and 0.015 to 0.09% silicate calculated as $SiO_2$. It is desirable to include an effective amount of an antifoaming compound in the concentrate. Such components are well known and preferably may be a polyglycol-type or a silicone-type antifoaming agent. The concentrate contains small amounts of water, usually 1 to 5% by weight water. Alkali metal hydroxide is employed to provide a final pH of 7-10 for the concentrate plus water coolant formulation.

Sodium tetraborate is the preferred borate additive; the available hydrates such as sodium tetraborate pentahydrate ($Na_2B_4O_7 \cdot 5H_2O$) and sodium tetraborate decahydrate ($Na_2B_4O_7 \cdot 10H_2O$) are conveniently employed, the latter being preferred. Borate, expressed as sodium tetraborate decahydrate, in amount of 0.4 to 1.5 wt. % of the concentrate is employed in accordance with the invention.

Sodium molybdate ($Na_2MoO_4$) is the preferred molybdate additive. The commercially available dihydrate ($Na_2MoO_4 \cdot 2H_2O$) is conveniently employed. Molybdate expressed as sodium molybdate dihydrate in amount of 0.1 to 0.3 wt. % of the antifreeze concentrate is employed in accordance with the invention.

Nitrate, when used, is preferably added in the form of sodium nitrate ($NaNO_3$). In accordance with the invention, nitrate, expressed as sodium nitrate, in amount of 0.1 to 0.2 wt. % is employed in the antifreeze concentrate.

Silicate is suitably employed in the form of sodium metasilicate ($Na_2SiO_3$). The available hydrates, most notably the pentahydrate ($Na_2SiO_3.5H_2O$) are conveniently used. Expressed as sodium metasilicate pentahydrate, amounts of 0.10 to 0.20 wt. % of the antifreeze concentrate are employed in accordance with the invention.

Tolyltriazole, also known as methylbenzotrizole, ($C_7H_7N_3$) is employed in the antifreeze concentrate in amounts of 0.05 to 0.30 wt. % of the concentrate in accordance with the invention.

Alkali metal hydroxide, preferably KOH is employed in amount sufficient to provide a final pH of 7-10 for the antifreeze combination of water and concentrate.

Summarizing, the antifreeze concentrates of the invention have the composition by weight shown in the following table:

TABLE 1

| COMPONENT | (WT %) CONCENTRATION RANGE |
|---|---|
| Alkylene Glycol | 90 to 98 |
| Water | 1 to 5 |
| Borate, calculated as $B_4O_7$ | 0.10 to 0.50 |
| Molybdate, calculated as $MoO_4$ | 0.13 to 1.0 |
| Nitrate, calculated as $NO_3$ | 0 to 0.30 |
| Tolyltriazole, calculated as tolytriazole | 0.05 to 0.30 |
| Silicate, calculated as $SiO_2$ | 0.015 to 0.09 |
| Phosphorous acid, calculated as $H_3PO_3$ | 0.05 to 0.15 |

Propylene glycol is the preferred glycol, and the various components are preferably alkali metal compounds, usually sodium compounds according to the following:

TABLE 2

| COMPONENT | CONCENTRATION RANGE |
|---|---|
| Propylene Glycol | 90 to 98 |
| Water | 1 to 5 |
| Sodium Tetraborate Decahydrate ($Na_2B_4O_7.10H_2O$) | 0.40 to 1.20 |
| Sodium Molybdate (VI) Dihydrate ($Na_2MoO_4.2H_2O$) | 0.10 to 1.5 |
| Sodium Nitrate ($NaNO_3$) | 0 to 0.40 |
| Tolyltriazole (methylbenzyltriazole) ($C_7H_7N_3$) | 0.05 to 0.30 |
| Sodium Metasilicate Pentahydrate ($Na_2SiO_3.5H_2O$) | 0.05 to 0.20 |
| Phosphorous Acid | 0.05 to 0.15 |

The present invention relates to the antifreeze concentrates described above as well as to coolant formulations wherein the concentrate is admixed with water and employed in internal combustion engines. Generally, it is desirable to admix the concentrate with about an equal volume of water for use, although amounts of water ranging broadly from 30 to 80 wt. % of the coolant formulation are useful.

EXAMPLE I

An antifreeze concentrate was prepared as follows:

In preparing the concentrate, propylene glycol was first combined with the (Pluronic) L-61 with agitation. To this glycol solution were individually added the sodium tetraborate decahydrate, the sodium nitrate and the tolyltriazole with good agitation and mild heating (50° C.) until the components dissolved. In a separate vessel the water and Q-1-6083 silicate stabilizer were combined with agitation and to this was added the KOH. When the caustic had dissolved, the sodium metasilicate was slowly added and allowed to dissolve. After the metasilicate had dissolved, the sodium molybdate dihydrate was added in several portions with good agitation and heating to about 50° C. When the molybdate was dissolved, the resulting solution was slowly added to the glycol solution and phosphorous acid was added with stirring to form the final antifreeze concentrate having the composition shown in Table 3.

TABLE 3

| COMPONENT | (WT %) CONCENTRATION |
|---|---|
| Propylene Glycol | 96.40 |
| Water | 2.00 |
| Sodium Tetraborate Decahydrate ($Na_2B_4O_7.10H_2O$) | 0.40 |
| Sodium Molybdate (VI) Dihydrate ($Na_2MoO_4.2H_2O$) | 0.20 |
| Sodium Nitrate ($NaNO_3$) | 0.10 |
| Tolyltriazole (methylbenzyltriazole) ($C_7H_7N_3$) | 0.20 |
| Sodium Metasilicate Pentahydrate ($Na_2SiO_3.5H_2O$) | 0.20 |
| Potassium Hydroxide (KOH) | 0.35 |
| Phosphorous Acid | 0.10 |
| Q 1-6083* (silicate stabilizer) | 0.05 |
| Pluronic L-61** (antifoam) | 0.01 |

*Polysiloxane manufactured by Dow Corning.
**Polyoxypropylene - polyoxyethylene block copolymer manufactured by BASF.

The concentrate was subjected to certain standard ASTM tests to determine its suitability. The following are the results attained:

| ASTM TEST RESULTS D-1384 Corrosion Test for Engine Coolants in Glassware | | |
|---|---|---|
| Coupon | Avg. Weight Loss, mg | Max Allowed* |
| copper | −3 | 10 |
| solder | −1 | 30 |
| brass | +5 | 10 |
| steel | +5 | 10 |
| cast iron | +4 | 10 |
| aluminum | −9 | 30 |

| D-4340 Corrosion of Cast Aluminum Alloys in Engine Coolants Under Heat-Rejecting Conditions | |
|---|---|
| Average Weight Loss, mg/cm2/week | Max Allowed* |
| 0.13 | 1.0 |

| D-2570 Simulated Service Corrosion Testing of Engine Coolants | | |
|---|---|---|
| Coupon | Avg. Weight Loss, mg | Max Allowed* |
| copper | 5 | 20 |
| solder | 2 | 60 |
| brass | 8 | 20 |
| steel | 1 | 20 |
| cast iron | 5 | 20 |
| aluminum | 2 | 60 |

*Maximum corrosion weight loss as specified in ASTM D-3306-89 specification for EG base engine coolants.

From these results it can be seen that the concentrate composition of the invention passed these ASTM test requirements by a wide margin.

What is claimed is:

1. An anti-corrosive antifreeze concentrate consisting essentially of:

| COMPONENT | (WT %) CONCENTRATION RANGE |
|---|---|
| Alkylene Glycol | 90 to 98 |
| Water | 1 to 5 |
| Borate, calculated as $B_4O_7$ | 0.1 to 0.4 |
| Molybdate, calculated as $MoO_4$ | 0.07 to 0.22 |
| Nitrate, calculated as $NO_3$ | 0 to 0.22 |
| Tolyltriazole, calculated as tolyltriazole | 0.1 to 0.3 |
| Silicate, calculated as $SiO_2$ | 0.03 to 0.06 |
| Phosphorous acid, calculated as $H_3PO_3$ | 0.05 to 0.15 |

2. An anti-corrosive antifreeze concentrate consisting essentially of:

| COMPONENT | (WT %) CONCENTRATION RANGE |
|---|---|
| Alkylene Glycol | 90 to 98 |
| Water | 1 to 5 |
| Sodium Tetraborate Decahydrate ($Na_2B_4O_7.10H_2O$) | 0.4 to 1.6 |
| Sodium Molybdate (VI) Dihydrate ($Na_2MoO_4.2H_2O$) | 0.1 to 0.3 |
| Sodium Nitrate ($NaNO_3$) | 0 to 0.2 |
| Tolyltriazole (methylbenzyltriazole) ($C_7H_7N_3$) | 0.1 to 0.3 |
| Sodium Metasilicate Pentahydrate ($Na_2SiO_3.5H_2O$) | 0.1 to 0.2 |
| Phosphorous Acid ($H_3PO_3$) | 0.05 to 0.15 |

3. The concentrate of claim 1 wherein said alkylene glycol is propylene glycol.

4. A coolant suitable for use in internal combustion engines which comprises the composition of claim 1 in admixture with water, water comprising 30 to 80 wt. % of the coolant.

5. A coolant suitable for use in internal combustion engines which comprises the composition of claim 1 in admixture with water, water comprising 40 to 60 wt. % of the coolant.

6. The concentrate of claim 2 wherein said alkylene glycol is propylene glycol.

7. A coolant suitable for use in internal combustion engines which comprises the composition of claim 2 in admixture with water, water comprising 30 to 80 wt. % of the coolant.

8. A coolant suitable for use in internal combustion engines which comprises the composition of claim 2 in admixture with water, water comprising 40 to 60 wt. % of the coolant.

* * * * *